May 11, 1965 G. G. KLINGER 3,182,658
SPECTACLE MOUNTING FOR GAS MASK
Filed Oct. 19, 1962 2 Sheets-Sheet 1

INVENTOR.
GUY G. KLINGER
BY
*William J. Ruano*
his ATTORNEY

May 11, 1965  G. G. KLINGER  3,182,658
SPECTACLE MOUNTING FOR GAS MASK
Filed Oct. 19, 1962  2 Sheets-Sheet 2
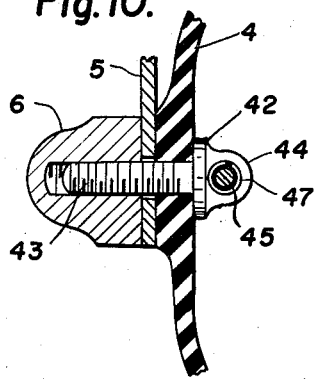
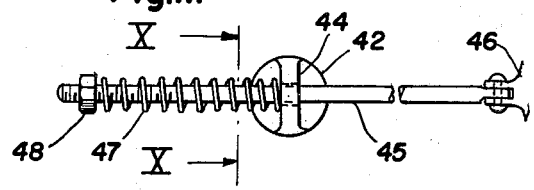
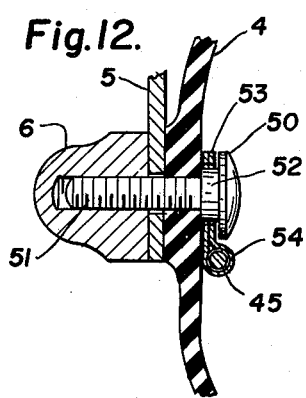
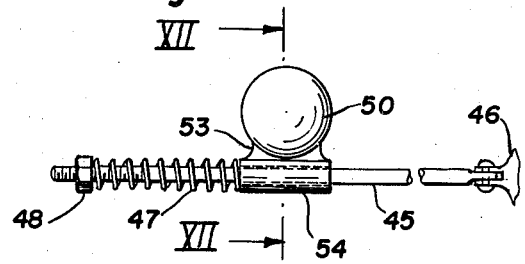
INVENTOR.
GUY G. KLINGER
BY
*William J. Ruano*
his ATTORNEY United States Patent Office 3,182,658
Patented May 11, 1965

3,182,658
SPECTACLE MOUNTING FOR GAS MASK
Guy G. Klinger, Wernersville, Pa., assignor to The Electric Storage Battery Company, Philadelphia, Pa.
Filed Oct. 19, 1962, Ser. No. 231,729
4 Claims. (Cl. 128—141)

This invention relates to an adjustable spectacle mounting in a gas mask and, more particularly, relates to means for adjustably mounting the temples of prescription glasses totally within the confines of the air-tight seal between the gas mask and head of the wearer.

An outstanding disadvantage of conventionally used mountings for spectacles worn with gas masks is that, in many constructions, the temples extend through and break the seal which exists between the periphery or margin of the gas mask and the wearer's head, therefore subjecting the wearer to the danger of noxious gas which will enter the mask through the broken seal. There are some types of spectacle mountings which are wholly enclosed in the mask, however, these have the outstanding disadvantage of being relatively complicated in construction, particularly as to the means for adjusting the distance between the lens frame and the eyes of the wearer.

An object of the present invention is to provide an adjustable mounting for prescription glasses or spectacles worn inside a gas mask and which will overcome the above-named disadvantages so as to provide a temple mounting which will have no deleterious effect on the seal between the mask and the wearer's head and which mounting or construction is relatively simple and inexpensive.

A more specific object of the invention is to provide prescription glasses with temples having a fractional dimension of the usual length and to pivot the ends of such temples to the existing pivotal joint between the gas mask and headgear so as to prevent the necessity of further performation or modification of the construction of a conventional gas mask.

Other objects and advantages of the invention will become more apparent from a study of the following description taken with the accompanying drawing wherein.

Figure 1:
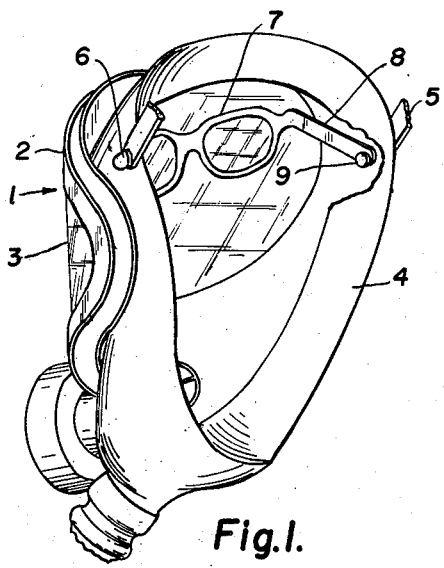
FIG. 1 is a perspective view of a gas mask as viewed from the interior having a mounting for prescription glasses which embodies the principles of the present invention and in which a part of the marginal portion of the gas mask is shown broken away to more clearly illustrate the pivotal mounting underneath thereof.

FIGS. 5, 6, 7, 8 and 9 are fragmentary plan views of the end portions of various modifications of the temple 8 shown in FIG. 1, illustrating different constructions for making the pivotal mounting for spectacles 7 adjustable;

FIG. 10 is a cross-sectional view taken along line X—X of FIG. 11 which is a side view of a modified temple mounting; and, FIG. 12 is a cross-sectional view taken along line XII—XII of FIG. 12 showing a further modification of the temple mounting.

Referring more particularly to FIG. 1 of the drawing, numeral 1 generally denotes a gas mask of well known construction having a curved lens retaining rim 2 of oval shape for supporting a lens 3 in air-tight relationship to the mask. A suitable headgear, a fragmentary portion of which is illustrated by numeral 5, is pivotally mounted by cap screws 6 to the gas mask for the purpose of holding the mask tightly against wearer's face. Any suitable headgear (not shown) may be pivotally mounted at 6, such as that shown in U.S. Patent No. 2,620,794 to R. A. George dated Dec. 9, 1952.

An important feature of the present invention resides in the construction and mounting of temples 8 of prescription glasses or spectacles 7 in order to provide adjustability of the spectacles 7 to different head and nose sizes of the wearer. A unique feature is the incorporation of the pivotal connection of temples 8 on the same pivotal means for the headgear. It should be especially noted that the temples of an ordinary pair of prescription glasses are cut substantially in half, as shown in FIG. 1, leaving front portions 8 so that no portion of the temple will extend between the sealing marginal portion 4 of the gas mask and the face of the wearer.

Figure 2:
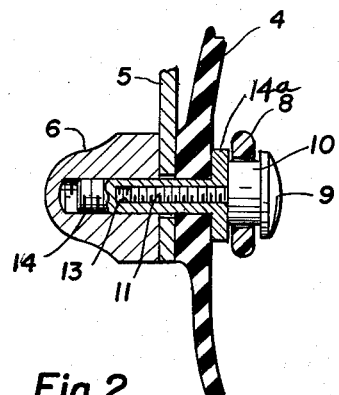
FIG. 2 is an enlarged, vertical cross-sectional view of the pivotal mounting as viewed on the left of FIG. 1.

As shown in FIG. 2, the common pivotal joint for the temple portions 8 and headgear 5 may be made up of a temple pivot screw 9 having an integral collar 10 and a threaded shank 11, which shank is screw threaded to an interiorly threaded portion 13 of a threaded shank 14 which is integral with an annular head portion 14a. An internally threaded cap screw 6, upon being turned clockwise, will draw in head portion 14a as well as pivot screw 9 so as to clamp the various parts in tight frictional engagement to prevent relative pivotal movement therebetween. Of course, when it is desired to permit pivotal movement of the headgear 5 relative to the mask, cap screws 6 are unscrewed slightly. Similarly, when freer pivotal movement of temples 8 is desired, pivot screw 9 is unscrewed slightly to prevent clamping of the temple between it and head portion 14a. It should be noted that screws 9 and 14a may be, instead, in the form of rivets, eyelets, studs or snap fasteners.

Figures 3, 3A:
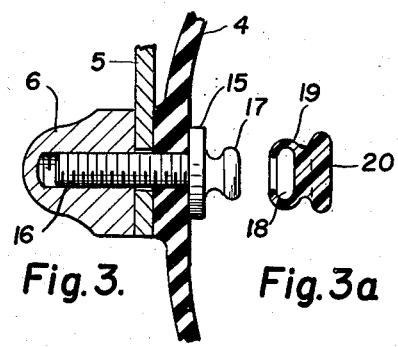
FIGS. 3 and 3a are views similar to FIG. 2, but showing the parts exploded, and illustrating a modification of the pivotal mounting.

More specifically, FIGS. 3 and 3a show a modification illustrating how the temples 20, having a flexible well portion 18, 19, may be snap-fastened to a screw having a correspondingly shaped head portion 17 integral with collar 15 and threaded shank 16.

Figures 4, 4A:
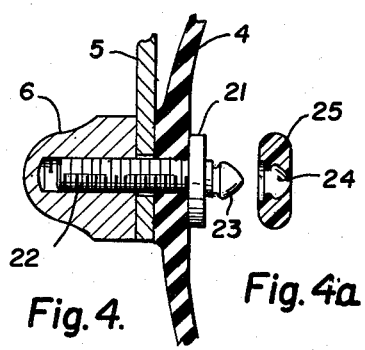
FIGS. 4 and 4a are views, shown exploded similar to FIGS. 3 and 3a, but illustrating a further modification.

FIGS. 4 and 4a show a still further modification illustrating temple 25 having a well portion 24 adapted to form a snap fit with a screw having a correspondingly shaped head portion 23 integral with collar 21 and threaded shank 22.

Figure 5:
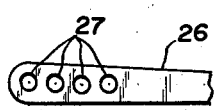

FIG. 5 shows a modification of the end portion of the temple 8, but denoted by numeral 26 and having a plurality of holes 27 so that pivot screw 9 of FIG. 2, for example, may be selectively inserted through any of the holes to adjust the length of temple portions 26.

Figure 6:
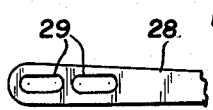

FIG. 6 shows a further modification in which a pair of slots 29 are provided in the end portion of temple portion 28.

Figure 7:
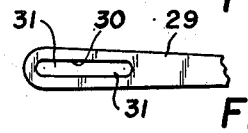

FIG. 7 shows a still further modification wherein a single slot 30 is provided in the end portion of temple portion 29.

Figure 8:
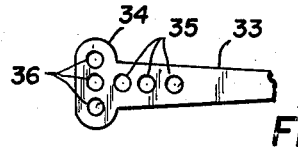

FIG. 8 shows a still further modification of the temple portion 33 wherein holes 35 and 36 are disposed at right angles to each other so that the temple length may be adjusted and the end portion 34 may be tilted to provide angular adjustment of the temple.

Figure 9:
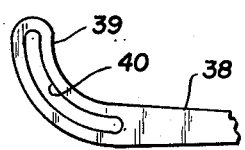

FIG. 9 shows a still further modification of temple portion 38 having an arcuate slot 40 in the curved end portion 39 to obtain adjustability in both length and tilt.

FIGS. 10 and 11 show a modification including a yieldable and automatically adjustable temple mounting. One end of temple 45 is connected to frame 46 and the other, threaded end has an adjusting nut 48 for adjusting the tension of helical spring 47. One end of the spring abuts against bearing portion 44 of head 42. Thus as the wearer places his head in the mask, his nose pushes against frame 46 against the action of springs 47 so as to automatically lengthen the distance between head 42 and frame 46 to suit the particular head size of the wearer without the need of further adjustments.

FIGS. 12 and 13 show a modification similar to FIGS. 10 and 11 except that the temple 45 is supported in the cradle portion 54 of a piece of strip metal or other suitable material 53, doubled back on itself. The shank 52 of the bolt head 50 extends through registering holes formed in strip metal 53.

Similarly, other pivotal mountings to provide a common pivot for the temple portions and the headgear may be provided with other adjustments to obtain selective lengths of the temple, without departing from the spirit or intent of the present invention.

The present invention is also useful in other face-protective devices, such as welding shields.

Thus it will be seen that I have provided an efficient mounting for pivotally mounting temples of prescription glasses inside a gas mask and arranged so as not to project through the sealing surfaces between the marginal portion of the gas mask and the face or head of the wearer and thus break such seal; furthermore, I have provided a relatively simple adjusting means for obtaining selective lengths of the temple and pivotal movement thereof to accommodate wearers having widely different ophthalmic requirements, head sizes and nose sizes.

While I have illustrated and described several embodiments of my invention, it will be understood that these are by way of illustration only, and that various changes and modifications may be made within the contemplation of my invention and within the scope of the following claims.

I claim:
1. In combination with a gas mask having a peripheral sealing portion adapted to form an air-tight seal with the face of the wearer and having a head-gear which is joined to said mask by pivotal mountings adapted to confront the temple portions of the wearer's head, in combination, a pair of spectacles having temple portions of a fraction of normal size, means for pivotally mounting the end portions of said temple portions on said pivotal mountings coaxially thereof, and means for varying the length of the temple portions between the frame of the spectacles and the axis of said pivotal mountings so as to fit different head sizes and nose sizes of different wearers.

2. In combination with a gas mask having a peripheral sealing portion adapted to form an air-tight seal with the face of the wearer and having a head-gear which is joined to said mask by pivotal mountings adapted to confront the temple portions of the wearer's head, in combination, a pair of spectacles having temple portions of a fraction of normal size, means for pivotally mounting the end portions of said temple portions coaxially on said pivotal mountings, each of said pivotal mountings comprising a screw having a head portion and shank portion, the latter projecting through registering holes of said gas mask and headgear, a cap screw internally threaded for screw threading onto said shank portion, a second screw having a shank portion screw threaded to an internal threaded portion of said first mentioned screw, said second screw having a head portion forming a pivotal connection with the end portion of said temple portion, and means for adjusting the length of said temple portions so as to fit different head sizes and nose sizes of different wearers.

3. In combination with a gas mask having a peripheral sealing portion adapted to form an air-tight seal with the face of the wearer and having a headgear which is joined to said mask by pivotal mountings adapted to confront the temple portions of the wearer's head, in combination, a pair of spectacles having temple portion of a fraction of normal size, means for pivotally mounting the end portions of said temple portions on said pivotal mountings, said pivotal mountings each comprising a screw having a threaded shank portion extending through registering holes in said mask and headgear, a cap screw having an internally threaded portion which is screw threaded to said temple portion having a cup portion shaped corresponding to said head portion and adapted to form a snap fit therewith.

4. The combination recited in claim 3 wherein the end portion of said temple portion is provided with slot means for selective insertion of said shank portion for adjusting the length of the temple portion so as to adjust the spectacles to varying head sizes and nose sizes.

References Cited by the Examiner

UNITED STATES PATENTS

| | | |
|---|---|---|
| 2,158,642 | 5/39 | Tartrais. |
| 2,620,794 | 12/52 | George _____ 128—141 |
| 2,962,722 | 12/60 | Curran _____ 2—14 |

RICHARD A. GAUDET, *Primary Examiner.*

JORDAN FRANKLIN, *Examiner.*